United States Patent [19]

Muto et al.

[11] Patent Number: 5,206,100
[45] Date of Patent: Apr. 27, 1993

[54] SEPARATOR AND SEALED LEAD ACID BATTERY

[75] Inventors: Junji Muto; Hironori Kitawaki; Shoji Sugiyama; Yasuhide Nakayama; Katsumi Kitagawa; Kenjiro Kishimoto, all of Osaka, Japan

[73] Assignees: Nippon Sheet Glass Co., Ltd.; Yuasa Battery Co., Ltd., both of Osaka, Japan

[21] Appl. No.: 731,148

[22] Filed: Jul. 15, 1991

[30] Foreign Application Priority Data

Aug. 24, 1990 [JP] Japan .................................. 2-223219

[51] Int. Cl.$^5$ .............................................. H01M 2/16
[52] U.S. Cl. ......................................... 429/247; 501/35
[58] Field of Search ............................. 429/247; 501/35

[56] References Cited

U.S. PATENT DOCUMENTS

| | | | |
|---|---|---|---|
| 3,085,887 | 4/1963 | Labino et al. | 501/35 |
| 4,216,280 | 8/1980 | Kono et al. | 429/247 |
| 4,233,379 | 11/1980 | Gross et al. | 501/35 X |
| 4,764,487 | 8/1988 | Lewis | 501/35 X |
| 4,911,789 | 3/1990 | Rieunier et al. | 429/242 X |

FOREIGN PATENT DOCUMENTS

| | | | |
|---|---|---|---|
| 2426982 | 12/1979 | France. | |
| 60-100363 | 6/1985 | Japan | 429/247 |
| 458522 | 1/1975 | U.S.S.R. | 501/35 |
| 1599077 | 8/1981 | United Kingdom. | |
| 2127613 | 4/1984 | United Kingdom. | |

*Primary Examiner*—Stephen Kalafut
*Attorney, Agent, or Firm*—Kanesaka and Takeuchi

[57] ABSTRACT

A separator substantially comprising only alkali-containing glass fibers with an average fiber diameter of less than 2 μm, and having an electrolyte dripping speed of lower than 80 mm/hr and a content of sulfer S at the surface of the glass fibers of less than 0.02% by weight, as well as a sealed lead acid battery using such a separator.

26 Claims, 4 Drawing Sheets

SEPARATOR AND SEALED LEAD ACID BATTERY

FIELD OF THE INVENTION AND RELATED ART STATEMENT

The present invention concerns a separator and a sealed lead acid battery and, more in particular, it relates to a separator causing less stratification of an electrolyte and a long life and inexpensive sealed lead acid battery using such a separator.

A sealed lead acid battery comprises separators and plates stacked within a container, in which an electrolyte is retained in pores of the separators and both of positive and negative electrode plates so as not to flow. The sealed lead acid battery has an advantageous feature of excellent liquid leakage proofness, requiring no water supplement and causing less self-discharge.

As described in Japanese Patent Publication Sho 63-27826, in a large capacity sealed lead acid battery with a great plate height, the electrolyte retained in the pores of the separators and the plates varies in the concentration in the vertical direction when charge and discharge are repeated, although the concentration is uniform at the time of injection. That is, stratification is caused in which the concentration of the electrolyte is higher in the lower portion of the separator. Since the stratification tends to be caused mainly in the separators, it is required to increase the electrolyte retention of the separator, eliminate the difference in the electrolyte retention between the upper and the lower portions of the separator or increase the viscosity of the electrolyte by adding fine silica powder.

Separators mainly composed of glass fibers have been predominantly used so far. For preventing occurrence of stratification, various improvements have been attempted for enhancing the electrolyte retention of the separators used.

For instance, Japanese Patent Laid-Open Sho 62-133669 and 62-136751 disclose separators coated or mixed with powder, for example, of $SiO_2$, $TiO_2$ or oxide of rare earth element. Japanese Patent Laid-Open Sho 63-152853, 62-221954 and 61-269852 disclose the use of silica or formed pearlite as powder.

Further, Japanese Patent Laid-Open Sho 63-143742 and 63-146348 disclose a separator comprising fine hollow tubular glass fibers.

OBJECT AND SUMMARY OF THE INVENTION

An object of the present invention is to provide a separator causing less stratification of an electrolyte and capable of ensuring a constant stacking pressure, as well as a long life and inexpensive sealed lead acid battery using such a separator.

Another object of the present invention is to provide a separator capable of preventing the stratification, having a large ration of an apparent density and stacking pressure, being easily assembled into the casing of a battery and causing no scattering in the stacking pressure, as well as to provide a sealed lead acid battery using such a separator.

A further object of the present invention is to provide a separator and a sealed lead acid battery having remarkably high electrolyte retention in the separator, capable of making the electrolyte retention equal in the vertical direction of the separator and preventing the stratification, thereby providing an extremely long life.

Accordingly, a sealed lead acid battery of long life having a stable and excellent cell performance can be obtained not only for a sealed lead acid battery of a small capacity but also for a sealed lead acid battery of a large capacity with a great plate height. It is apparent that such an improved life can be attained not only in a cyclic use but also in a floating use.

A still further object of the present invention is to provide a separator which is soft and highly elastic and, accordingly, can be assembled easily into the container and has a constant stacking pressure.

The separator according to the present invention substantially comprises only the alkali-containing glass fibers with an average fiber diameter of less than 2 μm, has an electrolyte dripping speed of less than 80 mm/hr, a sulfur (S) content at the surface of glass fibers of less than 0.02%, a ratio of apparent density/stacking (a radio between apparent density and stacking pressure) pressure of greater than $1.3 \times 10^{-4}$ $cm^{-1}$, a density under a pressure of 20 $kg/dm^2$ of less than 0.155 $g/cm^3$, and a density at a pressure of 60 $kg/dm^2$ of less than 0.220 $g/cm^3$ and an electrolyte retention of greater than 1.35 g/cc.

The sealed lead acid battery according to the present invention uses the separator as described above. Since the separator used for the sealed lead acid battery according to the present invention has an electrolyte dripping speed of less than 80 mm/hr, stratification can be prevented. If the electrolyte dripping speed exceeds 80 mm/hr, the electrolyte retaining performance is insufficient and, accordingly, so-called stratification in which the electrolyte concentration varies in the vertical direction of the separator becomes remarkable upon repeating charge/discharge cycles.

For preventing the stratification, the lower electrolyte dripping speed is more preferred but, if it is excessively low, it takes much time for pouring of electrolyte. Accordingly, the electrolyte dripping speed in the separator used for the sealed lead acid battery according to the present invention is preferably from 5 to 80 mm/hr and, more preferably, from 20 to 70 mm/hr.

In the present invention, the electrolyte dripping speed of the separator used for the sealed lead acid battery can be determined by the method as described in "examples" to be set forth subsequently.

The separator used for the sealed lead acid battery according to the present invention comprises 100% of glass fibers with an average fiber diameter of less than 2 μm, preferably, less than 0.9 μm. It described in our prior application that an effect of providing the electrolyte dripping speed of 100 mm/hr can be attained by a separator comprising 100% glass fibers with the average fiber diameter of less than 0.65 μm, but a separator for a sealed lead acid battery with the electrolyte dripping speed of less than 80 mm/hr can be attained also by using glass fibers with an average fiber diameter of from 0.65 to 0.9 μm. This principle will be described later. If the diameter of the glass fiber is too small, the cost of the separator is increased. Thus, it is preferred in the separator used for the sealed lead acid battery according to the present invention that the average fiber diameter of the glass fibers is greater than 0.4 μm and, particularly, greater than 0.6 μm.

The glass fibers of the separator are preferably composed of alkali-containing silicate glass.

In the present invention, the glass fibers having satisfactory acid resistance are used suitably, among the alkali-containing silicate glass fibers. The extent of the acid resistance is preferably such that the loss of weight is less than 2% when measured in accordance with JIS C-2202 in a form of glass fibers with an average fiber diameter of less than 1 μm. Further, for the composition of such glass fibers, there can be mentioned those mainly comprising, by weight ratio, 60 to 75% of $SiO_2$ and 8 to 20% of $R_2O$ (alkali metal oxide such as $Na_2O$ and $K_2O$) in which the sum of $SiO_2$ and $R_2O$ is from 75 to 90%, and also containing one or more of other materials such as CaO, MgO, $B_2O_3$, $Al_2O_3$, ZnO and $Fe_2O_3$. Examples of preferred alkali-containing silicate glass are shown in Table 1 below.

TABLE 1

| Ingredient of composition (wt %) | Kind of glass | | |
|---|---|---|---|
| | A | B | C |
| $SiO_2$ | 68.5 | 66.5 | 72.6 |
| CaO | 6.7 | 6.5 | 7.3 |
| MgO | 2.5 | 2.6 | 3.9 |
| $B_2O_3$ | 4.0 | 4.7 | — |
| $Na_2O$ | 14.1 | 10.1 | 13.0 |
| $K_2O$ | 1.4 | 1.5 | 0.9 |
| $Al_2O_3$ | 2.5 | 4.1 | 1.7 |
| ZnO | — | 3.6 | — |
| $Fe_2O_3$ | — | — | 0.1 |

In the prior application, it is described that the separator used for the sealed lead acid battery may contain silica powder. However, since the separator prepared by mixing and sheeting the silica powder is inevitably hardened, it is not suitable for making the separator soft. In addition, when the silica powder is mixed for sheeting, the density of the separator is increased, to decrease the porosity and reduce the amount of electrolyte retention.

In addition, organic fibers and a liquid binder can be used together within such a range as capable of ensuring physical properties of the separator according to the present invention. However, since they also harden the separator, their use should be kept as little as possible.

For preparing the separator used for the sealed lead acid battery according to the present invention, use of the following method is advantageous for instance.

Specifically, glass fibers of relatively short length are prepared by an FA method (Flame Attenuation Method), centrifugal method or the like, which are disintegrated, cut and dispersed by a pulper.

Alternately, glass fibers may be cut short by appropriate cutting means in the midway of supplying them to a paper making machine net.

In Japanese Patent Laid-Open Sho 59-71255, it was explained to prepare a separator by charging glass fibers into water, sheeting them with addition of sulfuric acid and then drying by heating.

In this case, $SiO_2$ and $Na_2O$ in the glass react with $H_2SO_4$ to form $SiO_2.H_2O$, that is, water glass at the surface of glass fibers, thereby bonding fibers to each other. Further, $Na_2SO_4$ formed simultaneously has an effect of improving the affinity with the electrolyte.

The object of the present invention resides in making the separator soft to facilitate the assembling of a cell and reducing the scattering of the stacking pressure. Further, since it is intended for preventing the stratification by lowering the electrolyte dripping speed, it is necessary to weaken the affinity with the electrolyte by decreasing the amount of $Na_2SO_4$.

For this purpose, there can be mentioned various means.

When alkali-containing glass fibers are left as they are, alkali ingredients leach out from the surface (it is the same for the fibers after long period of time or heated for a long time).

If glass fibers, from the surface of which the low alkali ingredients leach out are used for usual sheet making, the thus prepared sheet can be finished soft.

It is also effective to use glass fibers with less $Na_2O$ ingredient in the glass composition.

Among the kinds of glasses shown in Table 1, "B" is appropriate, those containing 5 to 10% of $Na_2O$ being more preferred.

There is also a method of decreasing the amount of sulfuric acid so that leaching of Na upon sheeting is reduced.

Furthermore, water washing or drying may be applied after sheeting and drying.

In this way, bonding between glass fibers to each other is reduced to make the separator soft and more elastic. Accordingly, the separator can be easily assembled into the container. That is the ration of the apparent density/stacking pressure is increased, as well as since the thickness of the glass fibers free from binder tends to be increased, they can provide a stacking pressure even with a small amount of use so that scattering in the thickness of the plates, if any, can be absorbed due to the softness of the separator, thereby making the stacking pressure constant.

Further, the surface of the glass fibers has a nature causing less liquid dripping.

In the separator finished to a soft nature, since the separator tends to swell upon absorbing the electrolyte of the sealed battery, the electrolyte retention can be improved.

The extent of the softness can be expressed by the ratio of the apparent density/stacking pressure. It can also be expressed by the value for the electrolyte retention.

The method of measuring the electrolyte retention will be described subsequently. Since the soft separator swells in the thickness upon water absorption to increase the water absorbing amount, the value for the electrolyte retention is increased. Since a hard separator is less swollen in the thickness upon water absorption, the value for the electrolyte retention is decreased.

The sulfur element S in the soft separator comprising 100% glass fibers with a great elasticity according to the present invention shows a small value of less than 0.02% when measured.

A hard separator comprising 100% glass fibers with low elasticity shows a value greater than that explained above.

The measuring method will be described later.

The separator with a low S content has a high elasticity and great electrolyte retention, can be assembled with ease, and ensure a constant and proper stacking pressure even if the plate thickness varies and, in addition, the amount of electrolyte reduction during life time is also small since the electrolyte retention amount is large (refer to Tables 2 and 3).

Figure 3:
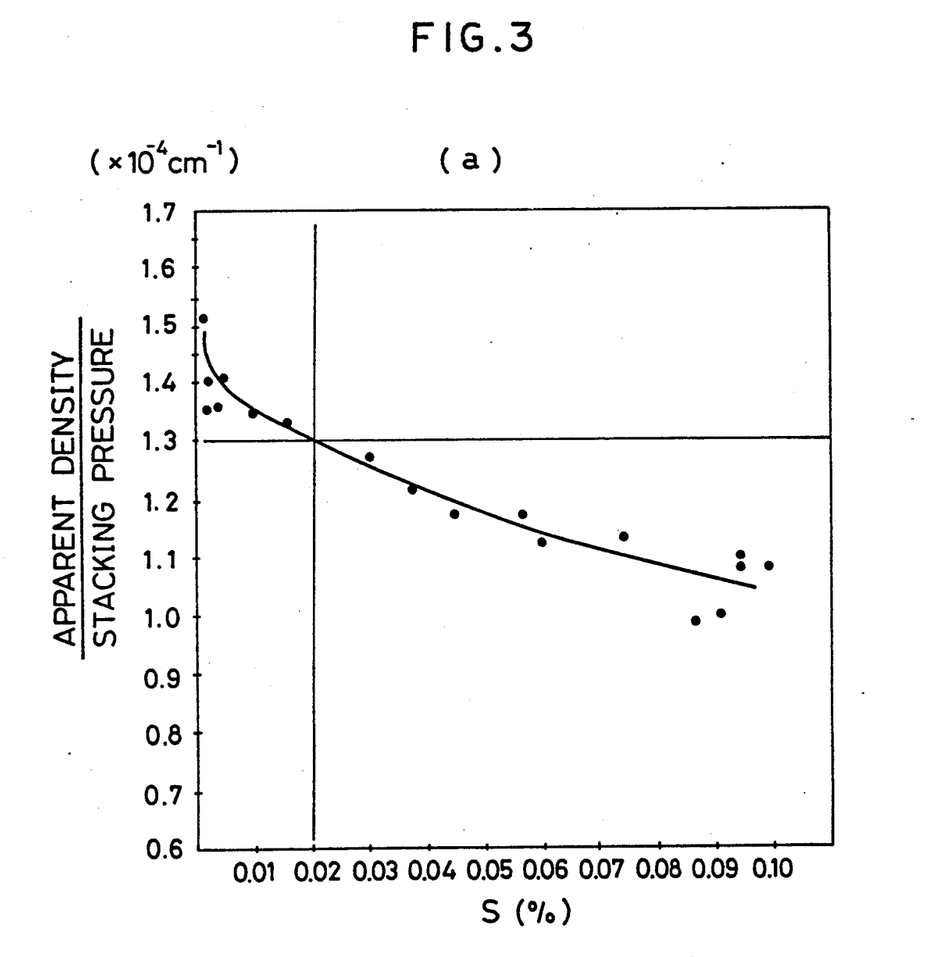
FIG. 3(a) is a graph illustrating a relationship between the content of S (%) and the ratio of apparent density/stacking pressure and FIG. 3(b) is a graph illustrating a relation between the content of S (%) and the electrolyte retention.

FIG. 3(a) shows a relationship between the content of S (%) and a ratio of the apparent density/stacking pressure, and FIG. 3(b) shows a relationship between the content of S (%) electrolyte retention.

If S is less than 0.02%, the ratio of the apparent density/stacking pressure is greater than $1.3 \times 10^{-4}$ cm$^{-1}$ and more than 1.35 g/cc of the electrolyte retention can be ensured.

A dispersant may be used when fibers are dispersed in water upon sheet making. Further, when dialkyl sulfo succinate is deposited by spraying from 0.005 to 10% by weight based on the glass fibers to sheeted fibers prepared by a wet process sheeting, for example, sheeted fibers placed on a sheeting net, the electrolyte retention of the separator can be improved by the affinity of the dialkyl sulfo succinate. Dialkyl sulfo succinate may be mixed into dispersing water in a sheeting vessel instead of spraying as described above.

There is no particular restriction for the thickness of the separator used for the sealed lead acid battery according to the present invention but the thickness is preferably greater than the average fiber length of the glass fibers.

In the present invention, the separator has an apparent density of less than 0.155 g/cm$^3$ under a pressure of 20 kg/dm$^2$ and an apparent density of less than 0.220 g/cm$^3$ under a pressure of 60 kg/dm$^2$. The separator has a sufficiently increased porosity and increased electrolyte retention amount by lowering the density to such an extent. Further, the low density is required also for increasing the values for the electrolyte retention and the ratio of apparent density/stacking pressure.

In the present invention, the elongation of the separator (elongation at break) is, preferably, from 3 to 8% measured as a value upon breakage when a sample of 15 mm width is gradually applied with a load. If the elongation is too small, the separator tends to be cut easily. If the elongation is too great, it results in a difficulty for the operation of assembling into the container.

In the present invention, the tensile strength of the separator is preferably greater than 400 g as a value when a tension load is applied to a sample of 15 mm width.

PREFERRED EMBODIMENT

Explanation will now be made referring to examples and comparative examples.

The method of measuring the electrolyte dripping speed, thickness and weight per unit area (basis weight) in examples and comparative examples are shown below.

Electrolyte Dripping Speed (1) a specimen is cut into a sizes of 50 mm × 250 mm.

(2) the specimen is set between two acryl resin plates (70–80 mm width × 500 mm length) opposed by way of spacers at both ends such that the weight of the specimen is about 6.75 g (charging density: 0.16–0.21 g/cm$^3$).

(3) The specimen is dipped into water.

(4) The specimen in a water saturated state is set to a measuring jig. In this case, excess water flows out.

(5) A sulfuric acid solution at a specific gravity of 1.3 is moderately poured by a pipette from above the acryl resin plate.

The poured sulfuric acid solution is at 100 mm height from above the specimen and this height is kept constant by occasionally supplementing the sulfuric acid solution.

The sulfuric acid solution is previously tinted by red ink or methyl orange.

(6) After completing the pouring of the electrolyte, each falling distance after 5 min, 10 min, 30 min and 60 min is measured by a steel measuring tape. That is, the dripping speed in the prevent invention is expressed by the dropping distance of the electrolyte for 60 min just after starting the pouring. The time is correctly measured by a stop watch.

(7) Measurement is conducted for three times on each sample.

Basis Weight (weight per unit area) (g/m$^2$)

Basis Weight is a value obtained by dividing the weight of the specimen by the area of the specimen.

Thickness (mm)

The specimen is measured in a state pressed by a load of 20 kg/dm$^2$ along the direction of the thickness (JIS-C-2202).

Apparent Density (g/cm$^3$)

The apparent density is expressed as a value given by the equation: $W/(S \times T)$ (g/cm$^3$) in which T represents the thickness of the specimen when a load of 10, 20, 30, 40, 50 or 60 kg is applied to the specimen (weight: W) with an area (S) of 10 cm × 10 cm.

Tensile Strength (g/10 mm width and elongation (%))

A specimen of 15 mm width is stretched at both ends and the value for external force (g) upon breakage of the specimen is determined. Further, elongation upon breakage is expressed by (%).

Electrolyte retention (g/cc)

Weight and thickness of the specimen are previously measured. After dipping the specimen in a band filled with water for 30 sec, it is pulled up on an inclined bench, maintained at 45° for 5 min and then the weight of the specimen is measured to determine the electrolyte retention according to the following equation.

$$\text{Electrolyte retention (g/cc)} = \frac{W_2 - W_1}{l \times W \times t}$$

where
- $W_1$: weight of specimen before dipping (g)
- $W_2$: weight of specimen after dipping (g)
- l: length ... 25 cm
- W: width (cm) ... 5 cm
- t: actual thickness of specimen (cm)

Analysis for S (%)

A solution of deposited matters on the surface of the specimen is rendered acidic with hydrochloric acid, to which barium chloride is added to precipitate barium sulfate. After aging, it is filtered and baked to weigh the precipitates which is converted and determined into the S content.

$$S\% \frac{\text{Barium sulfate} \times S \text{ content coefficient (0.1373)}}{\text{Specimen (g)}} \times 100$$

EXAMPLES 1-5

Separators for battery were manufactured with the blend of raw material shown in Table 2 and the results of measurement for various properties thereof are shown in Table 2. The separators were made by sheeting glass fibers of a "B" composition shown in Table 1 by applying heat treatment at 90% humidity and 40° C. for several hours. Results of measurement for other properties of each of the separators are shown in Table 2. (1), (2) and (3) show the results of repeating test under the same conditions, and (4) and (5) also show the results of repeating test under the same conditions.

Further, sealed lead acid batteries were assembled by using each of the separators, the effect for preventing stratification of the electrolyte was examined and the results are also shown in Table 2.

The assembled sealed lead acid battery comprised two positive plates each of 40 mm width×70 mm height×3.3 mm thickness and three negative plates of the same size and 2.0 mm thickness was stacked by way of a predetermined separator under a pressure of 20 kg/dm$^2$, in which H$_2$SO$_4$ with a specific gravity of 1.30 was poured by 43 cc per cell, and the capacity per cell was 5 Ah/20 HR.

The thus assembled batteries were subjected to alternate charge/discharge cycle life test with "discharge at 1.4 A for 3 hours and charge at 1.02 A for 5 hours" as one cycle. The life was defined as a point of time at which the capacity of the cell was reduced to 4.2 Ah (=1.4 A×3 h).

Among the life test, each one cell of the batteries under the test was decomposed at the 100th cycles and the specific gravity of the electrolyte in the upper and the lower portions of the separators and in the upper and the lower portions of the negative plates, as well as the amount of lead sulfate in the negative active material were measured.

COMPARATIVE EXAMPLES 1-6

Separators were manufactured in the same manners as in Examples 1-5 except for using the material shown in Table 3 and using the separators sheeted by the usual method by using glass fibers of the composition "A" in Table 1. Further, sealed lead acid batteries were assembled by using each of the separators. Results for the measurement of the properties of the separators and the effect for preventing the stratification of the electrolyte are shown in Table 3.

TABLE 2

| Example | | Example of the Invention | | | | |
|---|---|---|---|---|---|---|
| | | 1 | 2 | 3 | 4 | 5 |
| Blend of raw material | | | | | | |
| 0.6 μm | | 40 | 40 | 40 | — | — |
| 0.7 μm | | — | — | — | 100 | 100 |
| 0.8 μm | | 60 | 60 | 60 | — | — |
| 2.5 μm | | — | — | — | — | — |
| 4.0 μm | | — | — | — | — | — |
| Silica powder | | — | — | — | — | — |
| S | (%) | 0.0020 | 0.0031 | 0.0021 | 0.0041 | 0.0022 |
| Measuring Item | | | | | | |
| Basis Weight | (g/m$^2$) | 154 | 157 | 140 | 139 | 157 |
| Thickness | (mm) | 1.255 | 1.177 | 1.087 | 1.171 | 1.177 |
| Density | (g/cm$^3$) | 0.123 | 0.133 | 0.129 | 0.119 | 0.133 |
| Tensile strength | (g/15 mm width) | 453 | 607 | 517 | 520 | 587 |
| Electrolyte retention | (g/cc) | 1.90 | 1.70 | 1.91 | 2.02 | 1.61 |
| Apparent density stacking pressure | ($\times 10^{-4}$ cm$^{-1}$) | 1.52 | 1.35 | 1.40 | 1.40 | 1.35 |
| Electrolyte dripping speed | (mm/Hr) | 59 | 58.2 | 70 | 61 | 64 |
| Elongation | (%) | 4.85 | 3.75 | 5.14 | 6.53 | 3.61 |
| Amount use | (g/cell) | 4.35 | 4.43 | 4.05 | 4.00 | 4.45 |
| Stacking pressure | (kg/dm$^2$) | 33 | 29 | 18 | 17 | 30 |
| Density at 20 kg | (g/cm$^3$) | 0.116 | 0.131 | 0.116 | 0.113 | 0.125 |
| Density at 60 kg | (g/cm$^3$) | 0.192 | 0.196 | 0.186 | 0.183 | 0.189 |
| ($D_{60}-D_{10}$) | | 0.076 | 0.065 | 0.070 | 0.070 | 0.064 |
| Stratification preventive effect | | | | | | |
| Life cycle | | 540 | 535 | 515 | 538 | 527 |
| Electrolyte specific gravity at 100 cycle | upper | 1.294 | 1.294 | 1.291 | 1.293 | 1.292 |
| | lower | 1.305 | 1.306 | 1.309 | 1.306 | 1.307 |
| Lead sulfate content in negative electrode plate at 100 cycle (%) | upper | 5.2 | 5.2 | 6.1 | 5.3 | 5.7 |
| | lower | 6.1 | 6.0 | 6.7 | 6.4 | 6.3 |
| Electrolyte reduction up to life time | (g/cell) | 1.18 | 2.01 | 1.73 | 1.82 | 1.95 |

TABLE 3

| Example | | Comparative Example | | | | | |
|---|---|---|---|---|---|---|---|
| | | 1 | 2 | 3 | 4 | 5 | 6 |
| Blend of raw material | | | | | | | |
| 0.6 μm | | 30 | 30 | 35 | 27 | 40 | 50 |
| 0.7 μm | | — | — | — | — | — | — |
| 0.8 μm | | 50 | — | — | 63 | 60 | 50 |
| 2.5 μm | | 20 | 50 | 55 | — | — | — |
| 4.0 μm | | — | — | — | — | — | — |
| Silica powder | | — | 20 | 10 | 10 | — | — |
| S | (%) | 0.094 | 0.086 | 0.098 | 0.073 | 0.095 | 0.090 |

TABLE 3-continued

| Example | | 1 | Comparative Example 2 | 3 | 4 | 5 | 6 |
|---|---|---|---|---|---|---|---|
| Measuring item | | | | | | | |
| Basis Weight | (g/m$^2$) | 158 | 225 | 185 | 192 | 161 | 163 |
| Thickness | (mm) | 1.138 | 1.173 | 1.039 | 1.209 | 1.212 | 1.215 |
| Density | (g/cm$^3$) | 0.139 | 0.192 | 0.178 | 0.159 | 0.133 | 0.134 |
| Tensile strength | (g/15 mm width) | 1003 | 527 | 383 | 333 | 1200 | 1237 |
| Electrolyte retention | (g/cc) | 1.22 | 1.00 | 1.17 | 1.10 | 1.14 | 1.13 |
| Apparent density stacking pressure | ($\times 10^{-4}$ cm$^{-1}$) | 1.10 | 0.88 | 1.09 | 1.14 | 1.10 | 1.00 |
| Electrolyte dripping speed | (mm/Hr) | 97 | 70 | 60 | 59 | 70 | 64 |
| Elongation | (%) | 2.81 | 1.20 | 1.36 | 1.22 | 1.40 | 1.42 |
| Amount use | (g/cell) | 4.478 | — | 5.807 | 4.922 | 4.375 | 4.752 |
| Stacking pressure | (kg/dm$^2$) | 32.52 | — | 30.99 | 27.1 | 36.4 | 49.9 |
| Density at 20 kg | (g/cm$^3$) | 0.136 | 0.194 | 0.170 | 0.160 | 0.126 | 0.125 |
| Density at 60 kg | (g/cm$^3$) | 0.194 | 0.238 | 0.229 | 0.217 | 0.181 | 0.175 |
| (D$_{60}$-D$_{10}$) | | 0.058 | 0.044 | 0.059 | 0.057 | 0.055 | 0.050 |
| Stratification preventive effect | | | | | | | |
| Life cycle | | 3.70 | Assembly impossible, excessive stacking pressure | 535 | 539 | 510 | 530 |
| Electrolyte specific gravity at 100 cycle | upper | 1.277 | | 1.293 | 1.292 | 1.290 | 1.292 |
| | lower | 1.323 | | 1.307 | 1.307 | 1.310 | 1.308 |
| lead sulfate content in negative electrode plate at 100 cycle (%) | upper | 10.2 | | 5.1 | 5.3 | 6.2 | 5.8 |
| | lower | 16.7 | | 7.1 | 7.2 | 7.7 | 6.9 |
| Electrolyte reduction up to life time | (g/cell) | 3.15 | | 3.24 | 2.91 | 3.47 | 3.49 |

It is apparent from Tables 2 and 3 that since the effect of the separator for preventing the stratification is excellent, the sealed lead acid battery according to the present invention is excellent in the life performance and, in particular, cycle life performance.

It is also recognized from Tables 2 and 3 that the separators in the examples of the present invention show remarkably high electrolyte retention. Furthermore, the ratio of apparent density/stacking pressure is greater than $1.3 \times 10^{-4}$ and it is easy to be assembled into the container.

Figure 1:
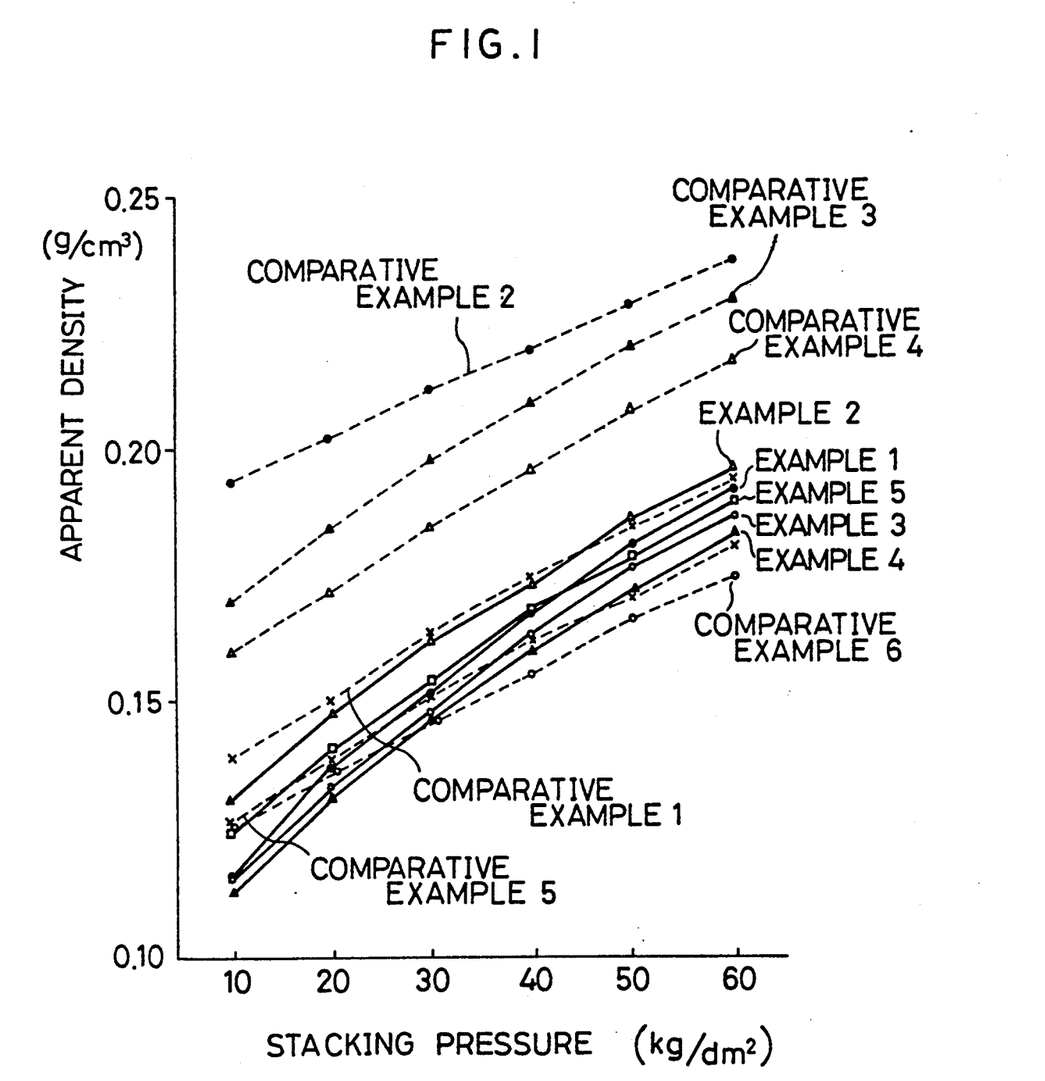
FIG. 1 and FIG. 2 are graphs showing the result of measurement for examples and comparative examples.

FIG. 1 shows a relation between the stacking pressure and the apparent density.

When the value (D$_{60}$−D$_{10}$)/50 obtained by dividing the difference between the apparent density D$_{60}$ under a pressure of 60 kg/dm$^2$ and the apparent density D$_{10}$ under a pressure of 10 kg/dm$^2$ with 50 kg/dm$^2$, that is, (apparent density/stacking pressure), is greater, the separator has higher elasticity, can be compressed easily when inserting into a container and is excellent in compression force after insertion, which shows that it is suitable as the separator.

Figure 2:
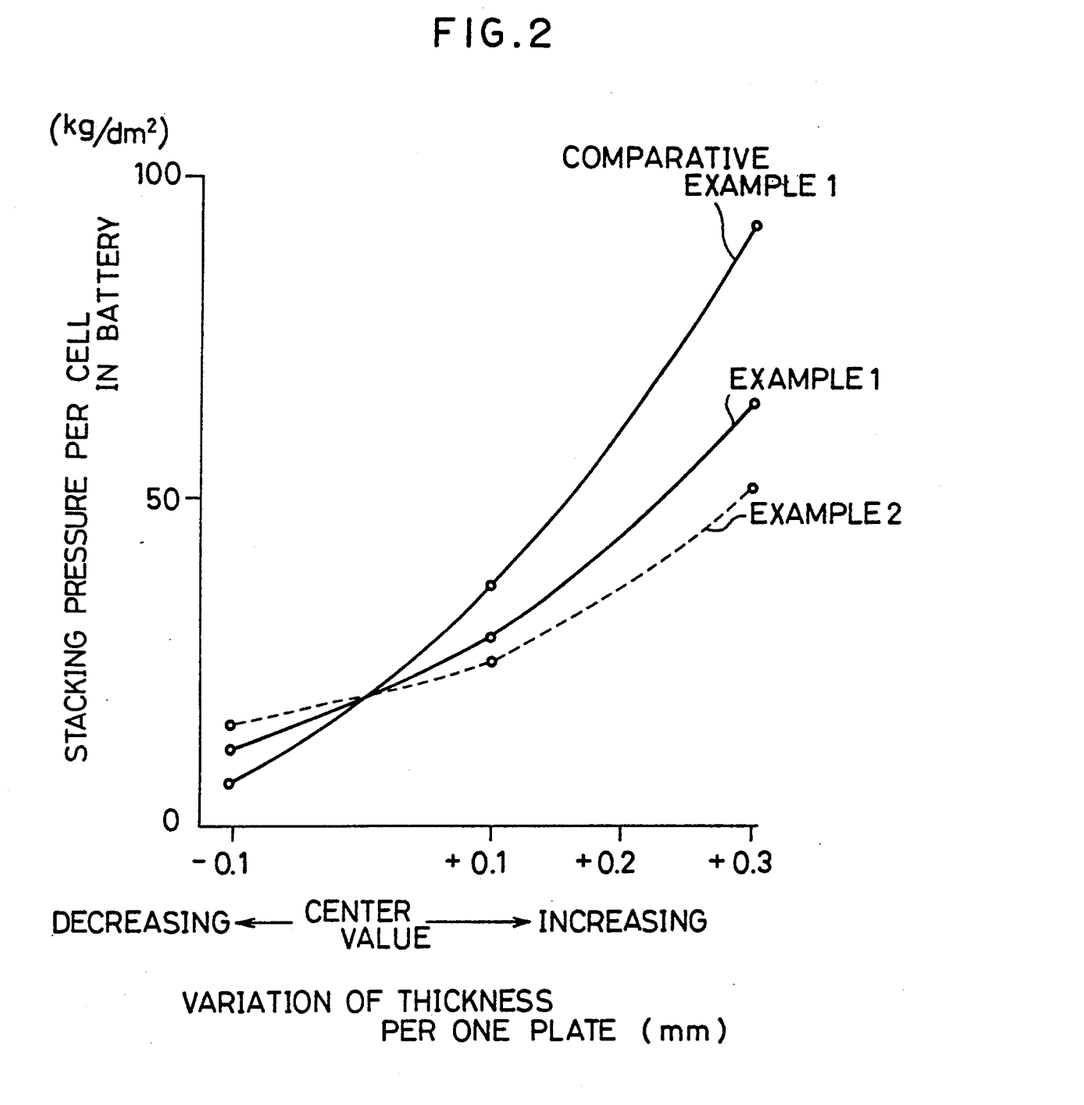

FIG. 2 shows a relationship between the stacking pressure and the weight of the plates of the separators in Example 1, 3 and Comparative Example 1. It can be seen from FIG. 2 that the separator according to the present invention is highly elastic and soft and, accordingly, the stacking pressure is absorbed even when the number of the plates is large and the separators can be inserted easily into the container, with no scattering of the stacking pressure.

What is claimed is:

1. A sealed lead acid battery using a separator substantially comprising only alkali-containing glass fibers with an average fiber diameter of less than 2 μm, and having an electrolyte dripping speed of lower than 80 mm/hr and a content of sulfur S at surfaces of the glass fibers of less than 0.02% by weight.

2. A sealed lead acid battery using a separator substantially comprising only alkali-containing glass fibers with an average fiber diameter of less than 2 μm, and having an electrolyte dripping speed of lower than 80 mm/hr and a ratio of apparent density and stacking pressure of greater than $1.3 \times 10^{-4}$ cm$^{-1}$.

3. A battery as defined in claim 2, wherein the apparent density under a pressure of 20 kg/dm$^2$ is less than 0.155 g/cm$^3$, and the density under a pressure of 60 kg/dm$^2$ is less than 0.220 g/cm$^3$.

4. A sealed lead acid battery using a separator substantially comprising only alkali-containing glass fibers with an average fiber diameter of less than 2 μm, and having an electrolyte dripping speed of lower than 80 mm/hr, and an electrolyte retention of greater than 1.35 g/cc.

5. A sealed lead acid battery as defined in claim 4, wherein the separator has a ratio of apparent density and stacking pressure greater than $1.3 \times 10^{-4}$ cm$^{-1}$.

6. A separator substantially comprising only alkali-containing glass fibers with an average fiber diameter of less than 2 μm, and having an electrolyte dripping speed of lower than 80 mm/hr and a content of sulfur S at surfaces of the glass fibers from 0.002 to 0.02% by weight.

7. A separator as defined in claim 6, wherein the separator has a radio of apparent density and stacking pressure of greater than $1.3 \times 10^{-4}$ cm$^{-1}$.

8. A separator as defined in claim 7, wherein the apparent density under a pressure of 20 kg/dm$^2$ is less than 0.155 g/cm$^3$, and the density under a pressure of 60 kg/dm$^2$ is less than 0.220 g/cm$^3$.

9. A separator as defined in claim 6, wherein the separator has an electrolyte retention of greater than 1.35 g/cc.

10. A separator as defined in claim 9, wherein the separator has a radio of apparent density and stacking pressure of greater than $1.3 \times 10^{-4}$ cm$^{-1}$.

11. A separator as defined in claim 6 wherein the average glass fiber diameter is from 0.4 to 2 μm.

12. A separator as defined in claim 7 wherein the average glass fiber diameter is from 0.4 to 2 μm.

13. A separator as defined in claim 8 wherein the average glass fiber diameter is from 0.4 to 2 μm.

14. A separator as defined in claim 9 wherein the average glass fiber diameter is from 0.4 to 2 μm.

15. A separator as defined in claim 6, wherein the alkali-containing glass is an alkali-containing silicate glass comprising 60 to 75% by weight of $SiO_2$ and 8 to 20% by weight of an alkali metal oxide.

16. A separator as defined in claim 7, wherein the alkali-containing glass is an alkali-containing silicate glass comprising 60 to 75% by weight of $SiO_2$ and 8 to 20% by weight of an alkali metal oxide.

17. A separator as defined in claim 8, wherein the alkali-containing glass is an alkali-containing silicate glass comprising 60 to 75% by weight of $SiO_2$ and 8 to 20% by weight of an alkali metal oxide.

18. A separator as defined in claim 9, wherein the alkali-containing glass is an alkali-containing silicate glass comprising 60 to 75% by weight of $Sio_2$ and 8 to 20% by weight of an alkali metal oxide.

19. A separator defined in claim 6, wherein the electrolyte dripping speed is from 5 to 80 mm/hr.

20. A separator defined in claim 7, wherein the electrolyte dripping speed is from 5 to 80 mm/hr.

21. A separator defined in claim 8, wherein the electrolyte dripping speed is from 5 to 80 mm/hr.

22. A separator defined in claim 9, wherein the electrolyte dripping speed is from 5 to 80 mm/hr.

23. A separator as defined in claim 7, wherein the ratio of the apparent density and stacking pressure is from $1.3 \times 10^{-4}$ $cm^{-1}$ to $1.6 \times 10^{-4}$ $cm^{-1}$.

24. A separator as defined in claim 8, wherein the apparent density under a pressure of 20 $kg/dm^2$ is from 0.11 to 0.155 $g/cm^3$, and the density under a pressure of 60 $kg/cm^3$ is from 0.18 to 0.220 $g/cm^3$.

25. A separator as defined in claim 9, wherein the electrolyte retention is from 1.35 to 2.1 g/cc.

26. A separator as defined in claim 10, wherein the apparent density/stacking pressure is from $1.3 \times 10^{-4}$ to $1.6 \times 10^{-4}$ $cm^{-1}$.

* * * * *